US 6,616,055 B2

(12) United States Patent
Okamura et al.

(10) Patent No.: US 6,616,055 B2
(45) Date of Patent: Sep. 9, 2003

(54) RETURNABLE CONTAINER PHYSICAL DISTRIBUTION MANAGEMENT SYSTEM USING INFORMATION SYSTEM

(75) Inventors: Kousaku Okamura, Omiya (JP); Yasuo Nakabayashi, Kobe (JP); Yasuhiro Nakagami, Inzai (JP)

(73) Assignee: Yushin System Co., Ltd., Tokyo (JP)

( * ) Notice: Subject to any disclaimer, the term of this patent is extended or adjusted under 35 U.S.C. 154(b) by 0 days.

(21) Appl. No.: 09/979,997

(22) PCT Filed: May 27, 2001

(86) PCT No.: PCT/JP01/02453
§ 371 (c)(1),
(2), (4) Date: Nov. 26, 2001

(87) PCT Pub. No.: WO01/72619

PCT Pub. Date: Oct. 4, 2001

(65) Prior Publication Data

US 2002/0161878 A1 Oct. 31, 2002

(30) Foreign Application Priority Data

Mar. 28, 2000 (JP) ........................................ 2000-089295
Mar. 23, 2001 (JP) ........................................ 2001-084402

(51) Int. Cl.⁷ ............................................. G06K 19/06
(52) U.S. Cl. .................................... 235/492; 235/375
(58) Field of Search ................................ 235/375, 492

(56) References Cited

U.S. PATENT DOCUMENTS 5,774,876 A * 6/1998 Woolley et al. .............. 235/492

FOREIGN PATENT DOCUMENTS

| JP | 7-61532 | 3/1995 |
| JP | 7-247007 | 9/1995 |
| JP | 8-28513 | 10/1996 |
| JP | 9-110137 | 4/1997 |
| JP | 10-51332 | 3/1998 |
| JP | 11-120250 | 4/1999 |

OTHER PUBLICATIONS

Abstract of JP 07–061532, *Patent Abstracts of Japan*, Application published: Mar. 7, 1995.
Abstract of JP 07–247007, *Patent Abstracts of Japan*, Application published: Sep. 26, 1995.
Abstract of JP 08–268513, *Patent Abstracts of Japan*, Application published: Oct. 15, 1996.
Abstract of JP 09–110137, *Patent Abstracts of Japan*, Application published: Apr. 28, 1997.
Abstract of JP 10–081332, *Patent Abstracts of Japan*, Application published: Mar. 31, 1998.
Soga, S., "Hi Sesshoku IC Gijutsu wo Katsuyo shita Jisedai Logistic System," *Hitachi Hyoron*, vol. 80, No. 4, pp. 353–358 (Apr. 1998).

* cited by examiner

Primary Examiner—Harold I. Pitts
(74) Attorney, Agent, or Firm—Ladas & Parry

(57) ABSTRACT

There is provided a returnable container physical distribution system adapted to the information society and, more particularly, a returnable container physical distribution system is provided in which IC cards are attached to returnable containers for easier connection with the internet to manage the returnable containers transported between a producer, a wholesaler and/or warehouse and a retailer more efficiently.

A computer network interconnects a terminal at a management canter for governing the system as a whole, a terminal at a returnable container delivery center for distributing returnable containers having IC cards attached thereto, a terminal at a producer who produces and ships products, and a terminal at a wholesaler and/or warehouse who wholesales and warehouses the products, and data are transmitted and received between the computer network and the IC cards at the terminals in routes for physical distribution of the returnable containers to allow physical distribution of the returnable containers to be managed at the management center on a comprehensive basis.

10 Claims, 13 Drawing Sheets

| NO. | ITEM | | NUMBER OF DIGITS | BYTE | POSITION |
|---|---|---|---|---|---|
| 1 | SYSTEM MANAGEMENT INFORMATION | | | | |
| 2 | | MEMBER COMPANY CODE FOR INITIAL LEASE | 6 | 6 | 1 |
| 3 | | MEMBER COMPANY NAME FOR INITIAL LEASE | 25 | 50 | 7 |
| 4 | | DATE OF INITIAL LEASE | 6 | 3 | 57 |
| 5 | | MEMBER COMPANY CODE FOR PREVIOUS LEASE | 6 | 6 | 60 |
| 6 | USE | MEMBER COMPANY NAME FOR PREVIOUS LEASE | 25 | 50 | 66 |
| 7 | | DATE OF PREVIOUS LEASE | 6 | 3 | 116 |
| 8 | | MEMBER COMPANY CODE FOR CURRENT LEASE | 6 | 6 | 119 |
| 9 | | MEMBER COMPANY NAME FOR CURRENT LEASE | 25 | 50 | 125 |
| 10 | | DATE OF CURRENT LEASE | 6 | 3 | 175 |
| 11 | | NUMBER OF TIMES OF RECYCLING | 3 | 2 | 178 |
| 12 | | IC CARD NO. | 24 | 24 | 180 |
| 13 | | RETURNABLE CONTAINER NO. (CODE) | 13 | 13 | 204 |
| 14 | | ITF CODE | 16 | 16 | 217 |
| 15 | | YEAR, MONTH AND DATE OF MANUFACTURE | 6 | 3 | 233 |
| 16 | | DATE OF SERVICE START | 6 | 3 | 236 |
| 17 | | TYPE OF RETURNABLE CONTAINER | 1 | 1 | 239 |
| 18 | | STATE OF USE AND MANAGEMENT (1:GOOD, 2:ORDINARY, 3:TO BE HANDLED WITH CARE, 4:DEFECTIVE, 5:UNUSABLE DUE TO DAMAGE ETC.) | 1 | 1 | 240 |
| 19 | | LAST DATE OF USE | 6 | 3 | 241 |

FIG.11

| NO. | | ITEM | NUMBER OF DIGITS | BYTE | POSITION |
|---|---|---|---|---|---|
| 1 | | RETURNABLE CONTAINER MANAGEMENT INFORMATION | | | |
| 2 | ORDER ENTRY | ORDER CODE (PRODUCER CODE) | 13 | 13 | 244 |
| 3 | | ORDERER NAME | 25 | 50 | 257 |
| 4 | | DATE OF ORDER ENTRY | 6 | 3 | 307 |
| 5 | | DATE OF SERVICE START | 6 | 3 | 310 |
| 6 | | DATE OF END OF SERVICE | 6 | 3 | 313 |
| 7 | | ORDER ENTRY NUMBER | 9 | 5 | 316 |
| 8 | | SUFFIX OF ORDER ENTRY NUMBER | 2 | 1 | 321 |
| 9 | ORDERING | SUPPLIER CODE | 13 | 13 | 322 |
| 10 | | SUPPLIER NAME | 25 | 50 | 335 |
| 11 | | DATE OF ORDER | 6 | 3 | 385 |
| 12 | | ORDER NUMBER | 6 | 3 | 388 |
| 13 | DELIVERY SCHEDULE | DESTINATION CODE | 13 | 13 | 391 |
| 14 | | SUFFIX OF DESTINATION CODE | 3 | 2 | 404 |
| 15 | | DESTINATION NAME | 25 | 50 | 406 |
| 16 | | DATE OF DELIVERY | 6 | 3 | 456 |
| 17 | | SCHEDULED DATE OF COLLECTION | 6 | 3 | 459 |
| 18 | WAREHOUSING | WAREHOUSE CODE | 13 | 13 | 462 |
| 19 | | WAREHOUSE NAME | 25 | 50 | 475 |
| 20 | | DATE OF WAREHOUSE | 6 | 3 | 525 |
| 21 | | WAREHOUSING NUMBER | 13 | 7 | 528 |
| 22 | | DISASSEMBLY FLAG (0: NOT YET, 1: DISASSEMBLED) | 1 | 1 | 535 |
| 23 | DELIVERY FROM WAREHOUSE | DESTINATION CODE | 13 | 13 | 536 |
| 24 | | DESTINATION NAME | 25 | 50 | 549 |
| 25 | | DATE OF DELIVERY FROM WAREHOUSE | 6 | 3 | 599 |
| 26 | | WAREHOUSE DELIVERY NUMBER | 13 | 7 | 602 |
| 27 | | ASSEMBLY FLAG (0: NOT YET, 1: ASSEMBLED) | 1 | 1 | 609 |
| 28 | COLLECTION | DATE OF COLLECTION INSTRUCTION | 6 | 3 | 610 |
| 29 | | COLLECTION INSTRUCTION NUMBER | 6 | 3 | 613 |
| 30 | | DATE OF ACCEPTANCE OF COLLECTION | 6 | 3 | 616 |
| 31 | | CLASS OF DELAY | 1 | 1 | 619 |
| 32 | | CLASS OF CLEANED | 1 | 1 | 620 |

FIG.12

| NO. | | ITEM | NUMBER OF DIGITS | BYTE | POSITION |
|---|---|---|---|---|---|
| 1 | PRODUCT MANAGEMENT INFORMATION | | | | |
| 2 | | PRODUCER CODE | 6 | 6 | 621 |
| 3 | | PRODUCER NAME | 25 | 50 | 627 |
| 4 | | DATE OF MANUFACTURE | 6 | 3 | 677 |
| 5 | | TASTING TIME LIMIT | 6 | 3 | 680 |
| 6 | | PRODUCT CODE | 13 | 13 | 683 |
| 7 | | PRODUCT NAME | 25 | 50 | 696 |
| 8 | PRODUCER | PRODUCT RANK | 1 | 1 | 746 |
| 9 | | TYPE OF COOLING (METHOD OF STORAGE) | 1 | 1 | 747 |
| 10 | | QUANTITY SHIPPED | 6 | 3 | 748 |
| 11 | | QUANTITY SHIPPED PER CASE | 3 | 2 | 751 |
| 12 | | UNIT OF SHIPMENT | 2 | 2 | 753 |
| 13 | | TIME OF SHIPMENT (YEAR, MONTH, DATE, HOUR AND MINUTE) | 10 | 5 | 755 |
| 14 | | SHIPMENT LOT NUMBER | 6 | 3 | 760 |
| 15 | | TYPE OF PACKING FOR SHIPMENT | 1 | 1 | 763 |
| 16 | | SHIPPING UNIT PRICE | 9 | 5 | 764 |
| 17 | | SHIPPING PRICE | 9 | 5 | 769 |
| 18 | | SHIPPER CODE | 6 | 6 | 774 |
| 19 | | SHIPPER NAME | 25 | 50 | 780 |
| 20 | WHOLESALER 1 | QUANTITY ARRIVED | 6 | 3 | 830 |
| 21 | | TIME OF ARRIVAL (YEAR, MONTH, DATE, HOUR AND MINUTE) | 10 | 5 | 833 |
| 22 | | SHORTAGE AT THE TIME OF ARRIVAL | 4 | 2 | 838 |
| 23 | | REASONS FOR SHORTAGE AT THE TIME OF ARRIVAL | 1 | 1 | 840 |
| 24 | | SHIPPER CODE | 6 | 6 | 841 |
| 25 | | SHIPPER NAME | 25 | 50 | 847 |
| 26 | WHOLESALER 2 | QUANTITY ARRIVED | 6 | 3 | 897 |
| 27 | | TIME OF ARRIVAL (YEAR, MONTH, DATE, HOUR AND MINUTE) | 10 | 5 | 900 |
| 28 | | SHORTAGE AT THE TIME OF ARRIVAL | 4 | 2 | 905 |
| 29 | | REASONS FOR SHORTAGE AT THE TIME OF ARRIVAL | 1 | 1 | 907 |
| 30 | | SHIPPER CODE | 6 | 6 | 908 |
| 31 | | SHIPPER NAME | 25 | 50 | 914 |
| 32 | RETAILER | QUANTITY ARRIVED | 6 | 3 | 964 |
| 33 | | TYPE OF PACKING AT ARRIVAL | 1 | 1 | 967 |
| 34 | | QUANTITY PER CASE AT ARRIVAL | 3 | 2 | 968 |
| 35 | | UNIT OF SHIPMENT AT ARRIVAL | 2 | 2 | 970 |
| 36 | | UNIT PRICE AT THE TIME OF ARRIVAL | 9 | 5 | 972 |
| 37 | | PRICE AT THE TIME OF ARRIVAL | 9 | 5 | 977 |
| 38 | | TIME OF ARRIVAL (YEAR, MONTH, DATE, HOUR AND MINUTE) | 10 | 5 | 982 |

FIG.13

| NO. | ITEM | NUMBER OF DIGITS | BYTE | BYTE POSITION |
|---|---|---|---|---|
| 1 | ACCOUNT MANAGEMENT INFORMATION | | | |
| 2 | LEASE DEPOSIT | 7 | 4 | 987 |
| 3 | UNIT LEASE CHARGE | 5 | 3 | 991 |
| 4 | DAYS OF LEASE | 3 | 2 | 994 |
| 5 | QUANTITY LEASED | 5 | 3 | 996 |
| 6 | LEASE AMOUNT | 7 | 4 | 999 |
| 7 | DATE OF START OF LEASE | 6 | 3 | 1003 |
| 8 | DATE OF END OF LEASE | 6 | 3 | 1006 |
| 9 | DAYS OF DELAY | 3 | 2 | 1009 |
| 10 | DELAY CHARGE | 7 | 4 | 1011 |
| 11 | CLOSING DATE FOR LEASE CHARGE BILLING | 6 | 3 | 1015 |
| 12 | SCHEDULED DATE OF LEASE CHARGE COLLECTION | 6 | 3 | 1018 |
| 13 | SCHEDULED AMOUNT OF LEASE CHARGE COLLECTION | 7 | 4 | 1021 |
| 14 | DATE OF BILLING | 6 | 3 | 1025 |
| 15 | BILL NUMBER | 7 | 4 | 1028 |

RETURNABLE CONTAINER PHYSICAL DISTRIBUTION MANAGEMENT SYSTEM USING INFORMATION SYSTEM

BACKGROUND OF THE INVENTION

1. Technical Field

The invention relates to a returnable container physical distribution management system using a computer network such as the internet and, more particularly, to a returnable container physical distribution management system using information system in which an information system as a network and IC cards attached to returnable containers are used in combination to allow comprehensive management of returnable containers used for baling or packing products transported between producers, wholesalers and/or warehouses and retailers (retail stores).

2. Description of the Related Art

In the field of physical distribution, returnable containers have been widely used to transport and carry products such as vegetables and fishes in a baled or packed state. Returnable containers are frequently transported between producers (farmers, fishermen, and so on), wholesalers and warehouses and retailers and, presently, they are not sufficiently managed. A technique for managing returnable containers is to allow data processing on them by printing bar codes for data processing on the exterior of returnable containers or by applying bar code labels thereto.

A system for managing returnable containers with bar codes has problems in that it is limited in the amount of information that can be processed and in that the relationship between bar code readers and the system can not be completely automated and bar code data can not be updated. When returnable containers are managed on an off-line basis using telephones and facsimile machines, a problem arises in that the management is very much inefficient and less reliable.

The present invention has been conceived taking the above-described situations into consideration, and it is an object of the invention to provide a returnable container physical distribution management system that is adapted to the information society and to provide a returnable container physical distribution management system using an information system in which IC cards are attached to returnable containers to increase the amount of processed data and which is easily connected to the internet through terminals to efficiently manage the returnable containers that are transported between producers, wholesalers and/or warehouses and retailers. It is another object of the invention to provide a product inspection system which is compatible with existing physical distribution information such as ITF (standard symbols for physical distribution based on JAN codes) and which relies upon IC cards for adding returnable containers with information such as places of production, producers (manufacturers), dates of manufacture, harvest information, time limits for consumption, time limits for eating, methods for storage, product ranks, product specifications, selling prices, buying prices and product quality.

SUMMARY OF THE INVENTION

In a returnable container physical distribution management system using an information system according to the present invention, a computer network interconnects a terminal at a management canter for governing the system as a whole, a terminal at a returnable container delivery center for distributing returnable containers having IC cards attached thereto, a terminal at a producer who produces and ships products, and a terminal at a wholesaler and/or warehouse who wholesales and stores the products, and data are transmitted and received between the computer network and the IC cards at the terminals in routes physical distribution of the returnable containers to allow physical distribution of the returnable containers to be managed at the management center on a comprehensive basis.

DETAILED DESCRIPTION OF PREFERRED EMBODIMENTS

It is an object of the present invention to systemize physical distribution in a comprehensive and coherent manner in respect of products (goods), returnable containers (containers for packing the products), information and money with the intention of encouraging the trend toward returnable containers and encouraging efforts toward zero emission of limited resources.

A description will now be made with reference to the drawings on a preferred mode for carrying out a returnable container physical distribution management system using an information system according to the invention.

Figure 1:
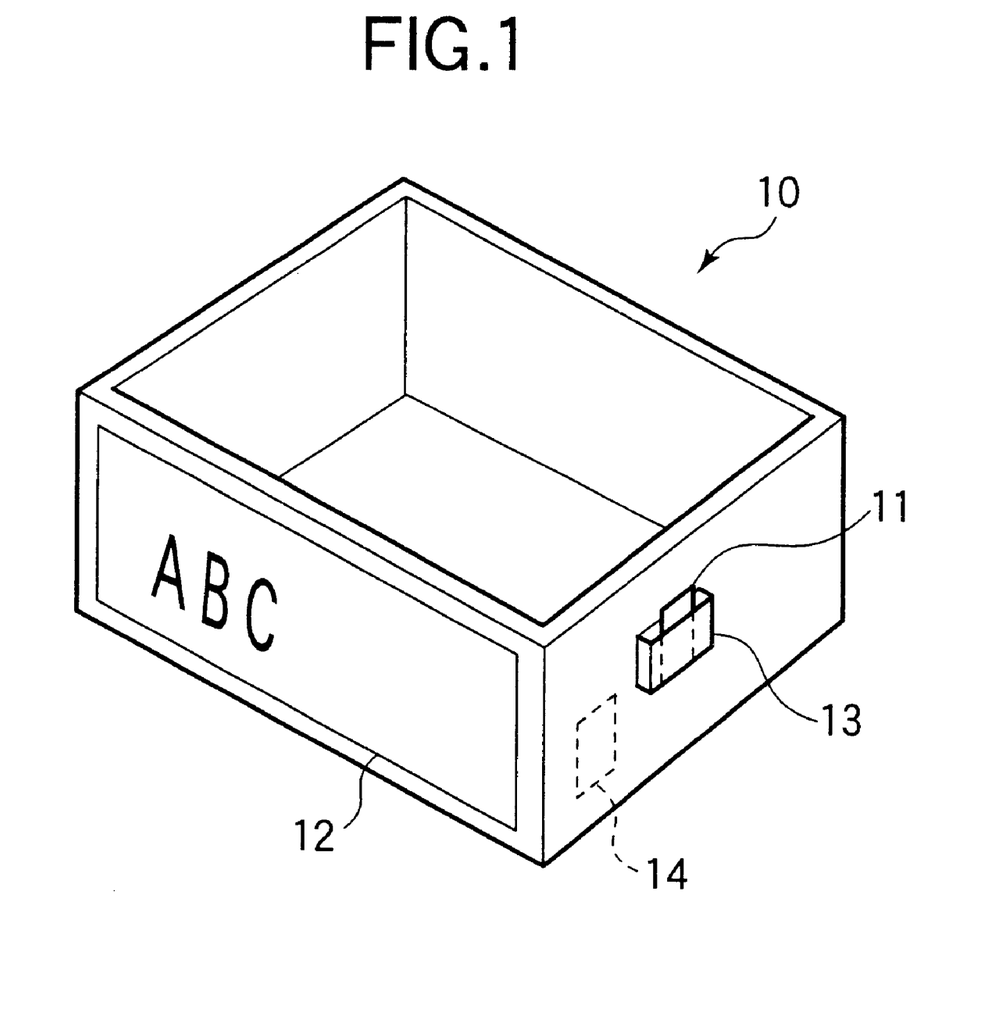
FIG. 1 is an external view of an example of a returnable container used in the present invention.

FIG. 1 shows an example of the appearance of a returnable container 10 used in the present invention, in which products are baled and carried in the returnable container 10 in the form of a housing. As shown in FIG. 1, an IC card holding pocket 13 in which a second IC card 11 can be contained is provided on a side of the returnable container 10; an entry section 12 for visibly entering required information such as the name and destination of products in the form of pictures, characters, and so on using a writing device such as a marker is provided; and a non-contact type first IC card 14 is embedded in a side or the bottom of the returnable container 10 such that it can not be seen from the outside.

The returnable container 10 used in the present invention is preferably a foldable case made of a transparent synthetic resin material, but this is not limiting the invention, and any type of case may be used as long as it is reusable and as long as an IC card can be attached to it.

Since the first IC card 14 is embedded in the body of the returnable container 10, it has a configuration to allow data to be read and written in no contact with a reader/ writer. Although the first IC card 14 is not limited to an embedded type and may be attached to a side of the returnable container 10, an embedded type is preferable in consideration to the environment of use such as the operation of cleaning the returnable containers 10 and the path of distribution of the same.

Since the second IC card 11 is contained in the IC card holding pocket 13 of the returnable container 10 and can therefore be removed from the returnable container 10, it may have a configuration to allow data to be read and written with a reader/writer on a non-contact basis and may obviously have an alternative configuration to allow data to be read and written with a reader/writer in contact therewith. The entry section 12 may be provided in a plurality of locations.

The above-described second IC card 11 is defined as a general IC card 11, and the first IC card 14 is defined as an individual IC card 14. In short, the individual IC card 14 is an IC card that represents a single returnable container 10. Specifically, one individual IC card 14 is associated with one returnable container 10, and distribution information regarding products contained in the associated returnable container 10 is stored in the individual IC card 14.

The general IC card 11 is used for distributing a plurality of returnable containers 10 in which identical products for the same destination are contained, and distribution information common to the plurality of returnable containers 10 (i.e., information corresponding to contents of a delivery slip or invoice used in a conventional distribution system) is stored in the same. In short, the general IC card 11 is an IC card that represents a plurality of returnable containers as a whole. In an actual distribution route of returnable containers 10, a general IC card 11 is contained in the IC card holding pocket 13 of the first returnable container 10 among a plurality of returnable containers 10 (which is located such that it can be recognized at a glance by the driver of the carrier who actually transports the plurality of returnable containers 10), and it is substituted for a delivery slip that is otherwise used by the driver of the carrier who actually transports the returnable containers 10. It is also helpful in inspecting the returnable containers 10 at each point of distribution where the returnable containers 10 are warehoused or delivered.

Figure 2:
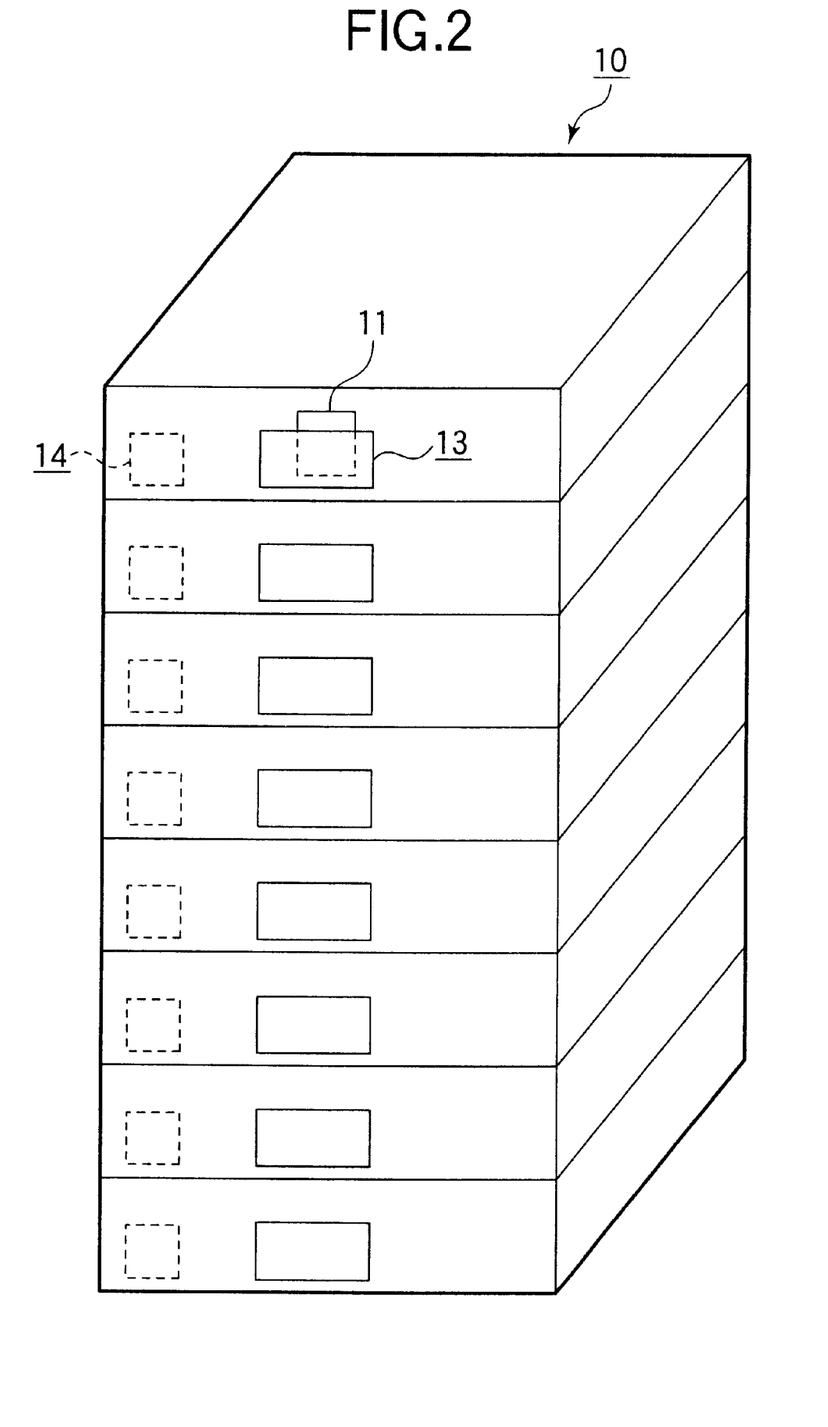
FIG. 2 is a schematic view showing a relationship between a general IC card and an individual IC card.

FIG. 2 is an illustration of the relationship between the general IC card 11 and individual IC card 14. For example, let us assume that a plurality of returnable containers 10 (eight cases in this example) containing identical products are delivered to a certain destination. Each of the returnable containers 10 has an embedded individual IC card 14. If a general IC card 11 is placed in the IC card holding pocket 13 of the first returnable container 10, the general IC card 11 serves as a delivery slip for the driver who transports the returnable containers 10.

The general IC card 11 may be a contact type IC card having a leuco-section. In this case, data in an IC chip in the general IC card 11 is rewritten with a reader/writer, and visible data in the leuco-section is simultaneously rewritten. The general IC card 11 may be a non-contact type IC card. In this case, data in an IC chip in the general IC card 11 is rewritten with a reader/writer, and visible data may be written in the entry section 12 of the returnable container 10 in which the general IC card 11 is contained or may be printed on the leuco-section.

Figure 3:
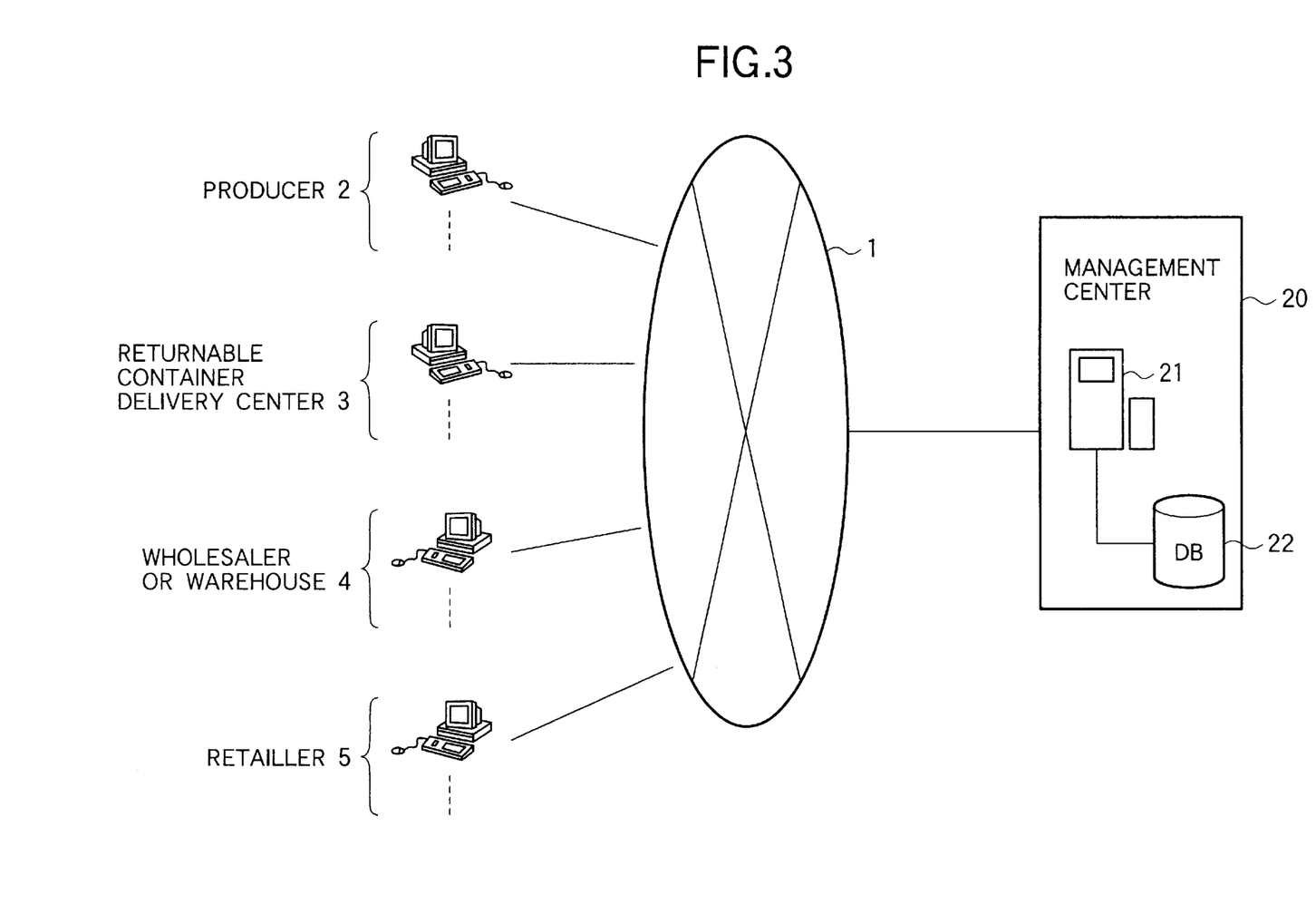
FIG. 3 is a block diagram showing a general configuration of a returnable container physical distribution management system using an information system according to the invention.

FIG. 3 shows an example of a general configuration of the invention in which terminals (personal computers) 2 at producers, terminals (personal computers) 3 at returnable container delivery centers, terminals (personal computers) 4 at wholesalers and/or warehouses and, further, terminals (personal computers) 5 at retailers are connected to an internet 1. A server 21 at a management center 20 is connected to the internet 1, and a database 22 is connected to the server 21.

Further, a reader/writer is provided in each of points of distribution including the producers, returnable container delivery centers, wholesalers and/or warehouses and retailers for reading and writing data from and in individual IC cards 14 embedded in returnable containers 10 or general IC cards 11 contained in the IC card holding pockets 13 of the returnable containers 10. The readers/writers for transmitting and receiving data to and from the general IC cards 11 and individual IC cards 14 are connected to the internet 1 through a terminal (personal computer) 6 to be described later. It is preferable to use readers/writers capable of reading and writing data on both of contact and non-contact bases.

The terminal (personal computer) 6 in this context is any of the terminals (personal computers) 2 at the producers, the terminals (personal computers) 3 at the returnable container delivery centers, the terminals (personal computers) 4 at the wholesalers and/or warehouses and the terminals (personal computers) 5 at the retailers. A non-contact type IC card 18 in this context means either a general IC card 11 or individual IC card 14 of a non-contact type.

Figure 4:
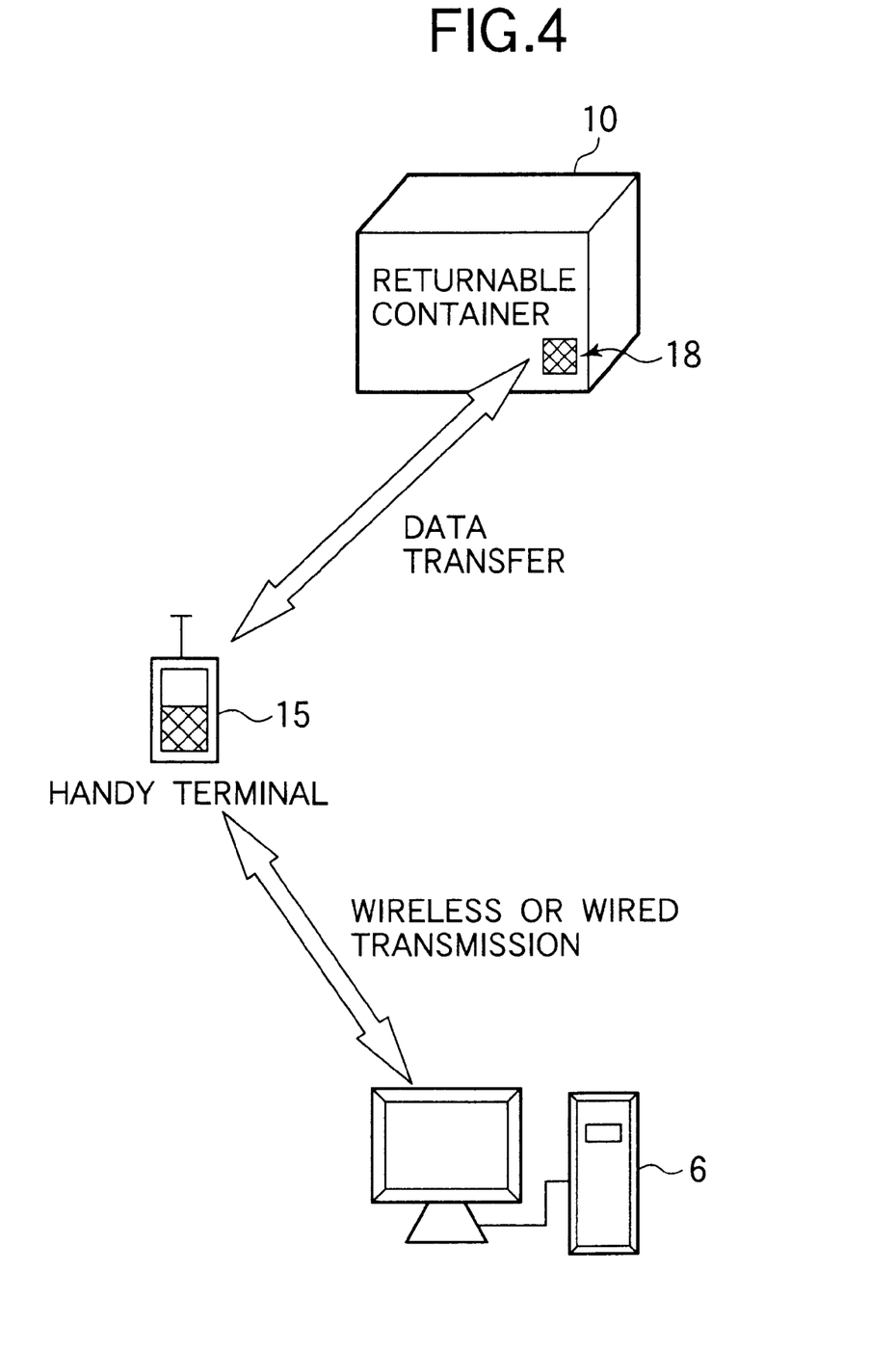
FIG. 4 is a schematic view that explains data transfer between a terminal and a non-contact type IC card of a returnable container through a handy terminal.
Figure 5:
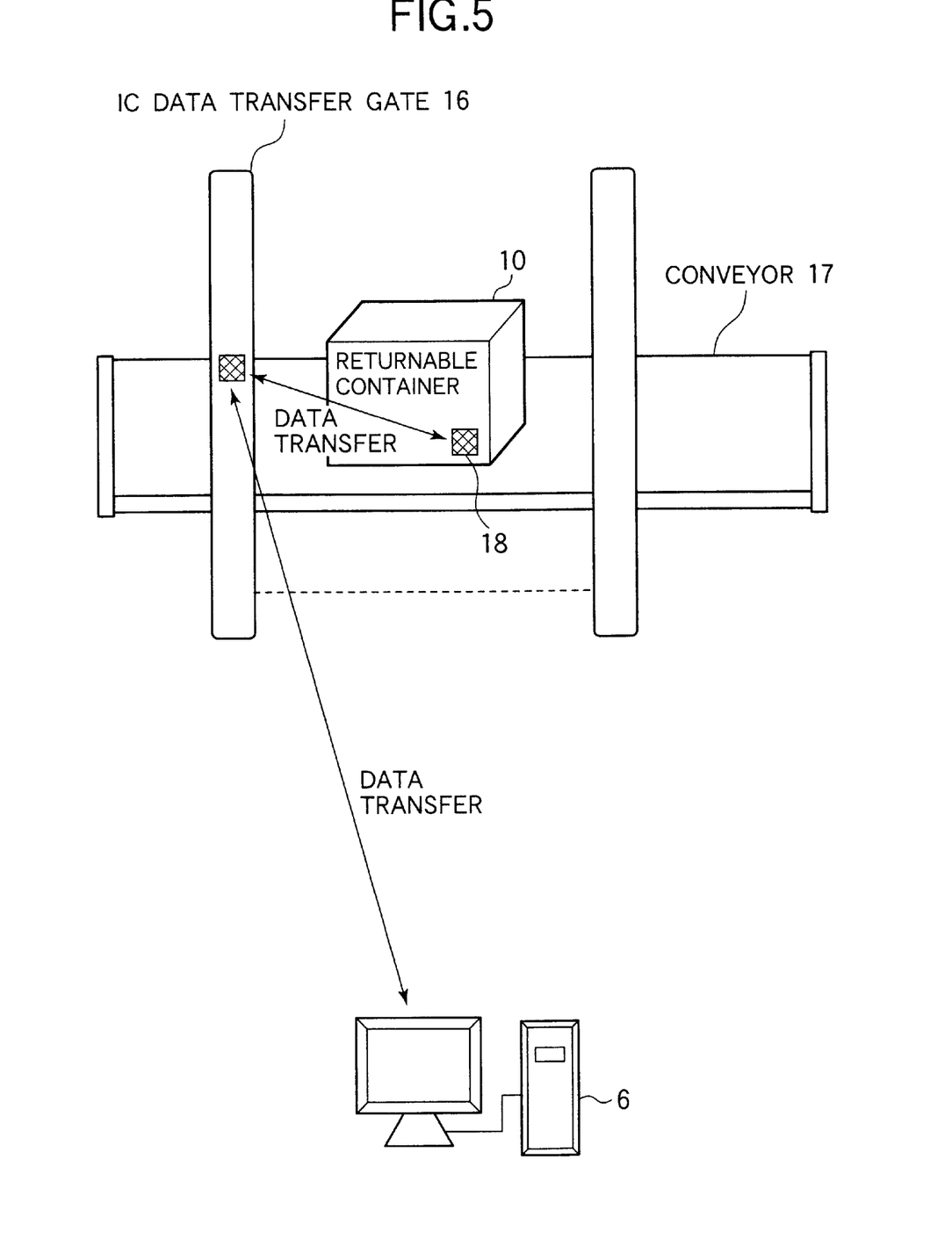
FIG. 5 is a schematic view that explains data transfer between a terminal and a non-contact type IC card of a returnable container through an IC data transfer gate.

It is not intended to limit the transmission and reception of data between the general IC cards 11 or individual IC cards 14 and the terminal (personal computer) 6 to the use of the readers/writers and, for example, a handy terminal as shown in FIG. 4 or an IC data transfer gate as shown in FIG. 5 may be used for the non-contact type general IC cards 11 or individual IC cards 14.

FIG. 4 is a schematic view that explains data transfer between the terminal (personal computer) 6 and a non-contact type IC card 18 of a returnable container 10 through a handy terminal 15. As shown in FIG. 4, the handy terminal 15 is in wired or wireless connection to the terminal (personal computer) 6 and is further connected to the internet 1 that is not shown through the terminal (personal computer) 6. Data transfer between the handy terminal 15 and non-contact type IC card 18 is performed on a wireless basis.

FIG. 5 is a schematic view that explains data transfer between the terminal (personal computer) 6 and a non-contact type IC card 18 of a returnable container 10 through an IC data transfer gate 16. As shown in FIG. 5, the terminal (personal computer) 6 transfers data to and from the non-contact type IC card 18 through the IC data transfer gate 16 on a wireless basis when the returnable container 10 that has been transported by a conveyor 17 passes through the IC data transfer gate 16. The terminal (personal computer) 6 is connected to the internet 1 that is not shown.

Figure 6:
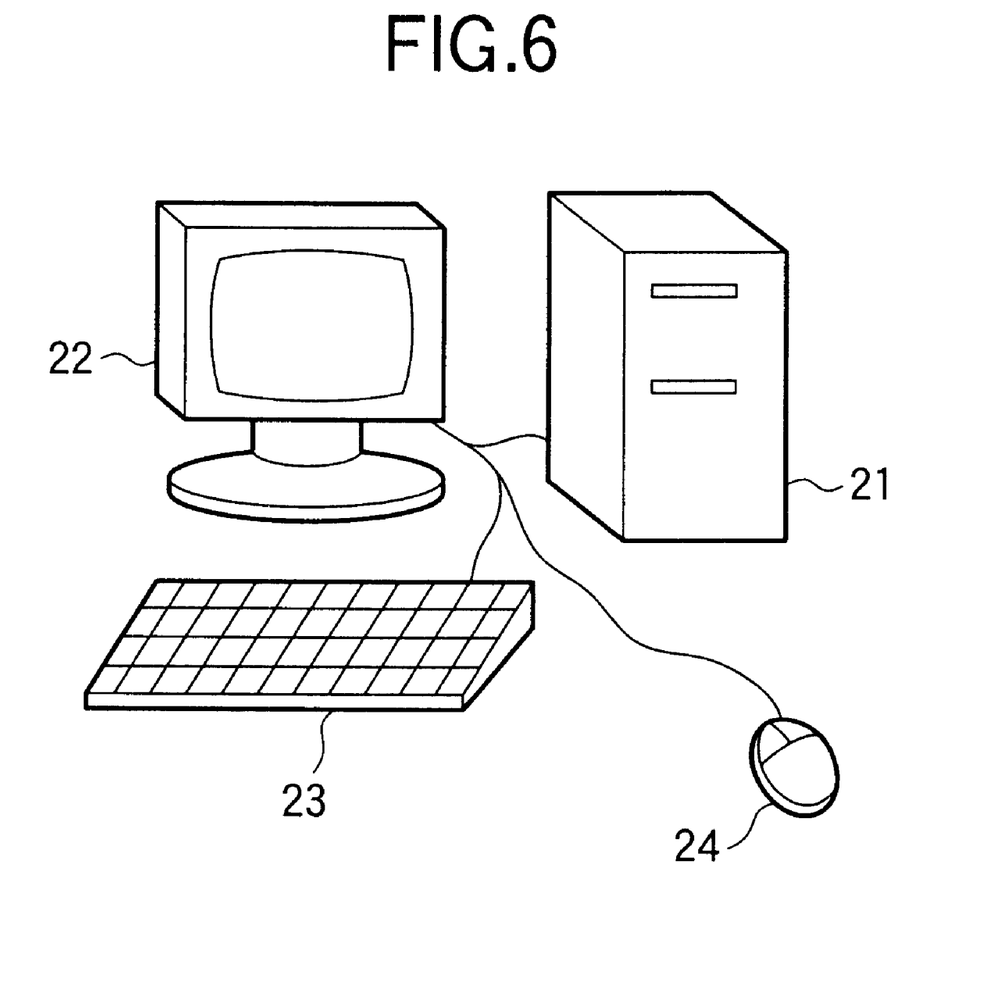
FIG. 6 is a configuration diagram showing an example of a terminal.

FIG. 6 shows an example of the terminals 2 through 5, which is constituted by a CPU unit 21 that has functions of copying and driving CDs and FDs and that performs data processing, a display unit 22 that is constituted by a CRT or an LCD and that displays images, characters, and so on and a keyboard 23 and a mouse 24 for inputting data, commands, and so on. For example, general-purpose computers are preferably used as the terminals 2 through 5.

The terminals 2 through 5 are not limited to the above-described configuration, and they may be personal digital assistants having a function of communicating with the internet, e.g., portable telephones having i-mode functions.

A non-contact type individual IC card 14 is embedded in a returnable container 10 used according to the invention. A general IC card 11 used according to the invention may be placed in the IC card holding pocket 13 of each returnable container 10 in advance. In short, data required for a general IC card 11 contained in the IC card holding pocket 13 of a returnable container 10 may be stored when it is required to use the general IC card 11 at each point of distribution. That is, a general IC card 11 is judged to be a general IC card 11 in use when the leuco-section of the same general IC card 11 is printed. Conversely, if the leuco-section of a general IC card 11 is not printed, the general IC card 11 is judged to be an unused general IC card 11.

Further, the general IC card 11 used according to the invention may alternatively be prepared in an appropriate quantity at each of points of distribution such as producers, returnable container delivery centers, wholesalers and/or warehouses and retailers instead of placing it in the IC card holding pocket 13 of each returnable container 10 in advance. In short, the prepared general IC cards 11 may be placed in the IC card holding pockets 13 of the returnable containers 10 after storing required data in them when it is required to use the general IC cards 11 for the returnable containers 10 at each point of distribution.

Figure 7:
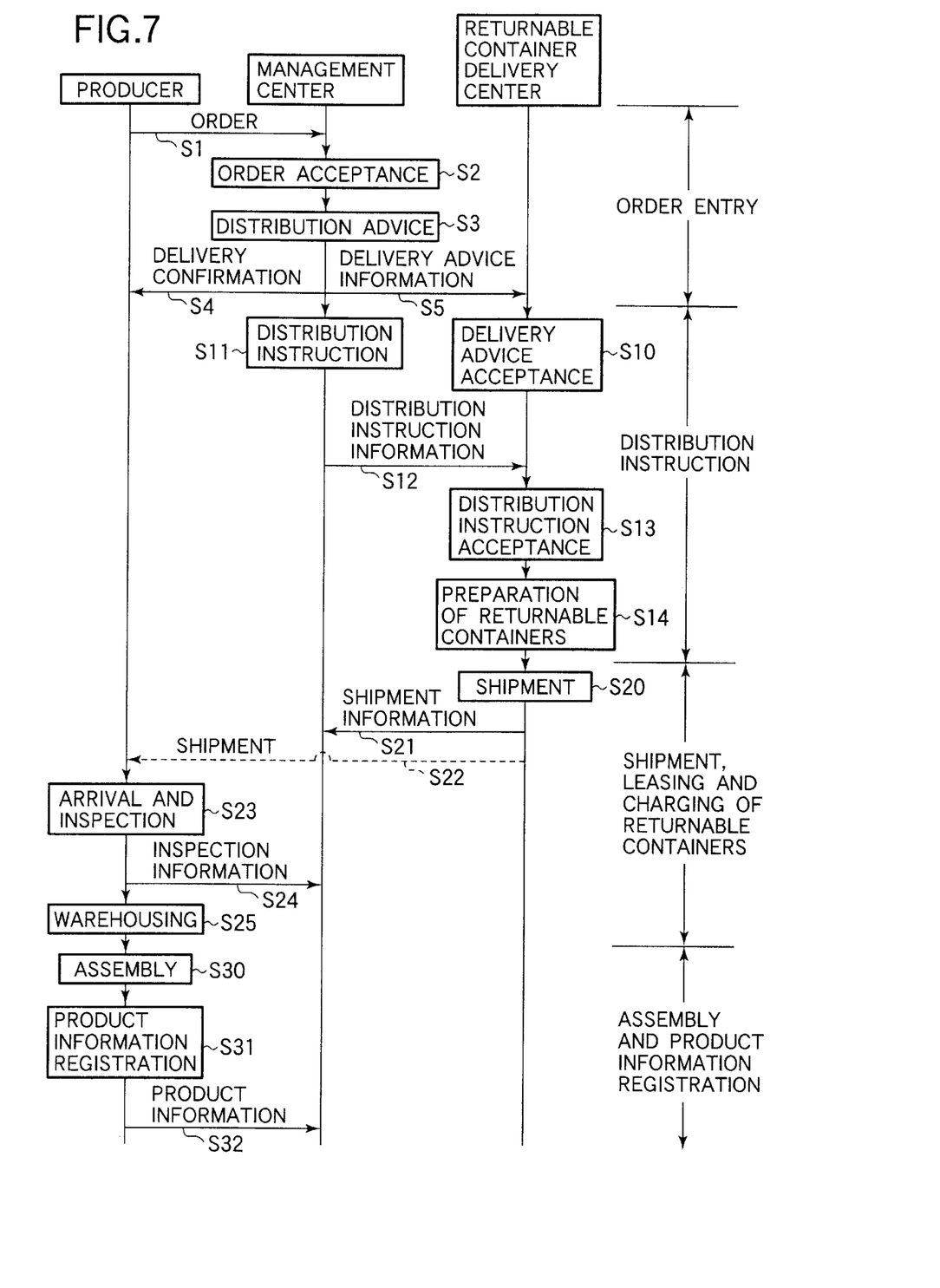
FIG. 7 is a flow chart showing a part of an example of an operation according to the invention.
Figure 8:
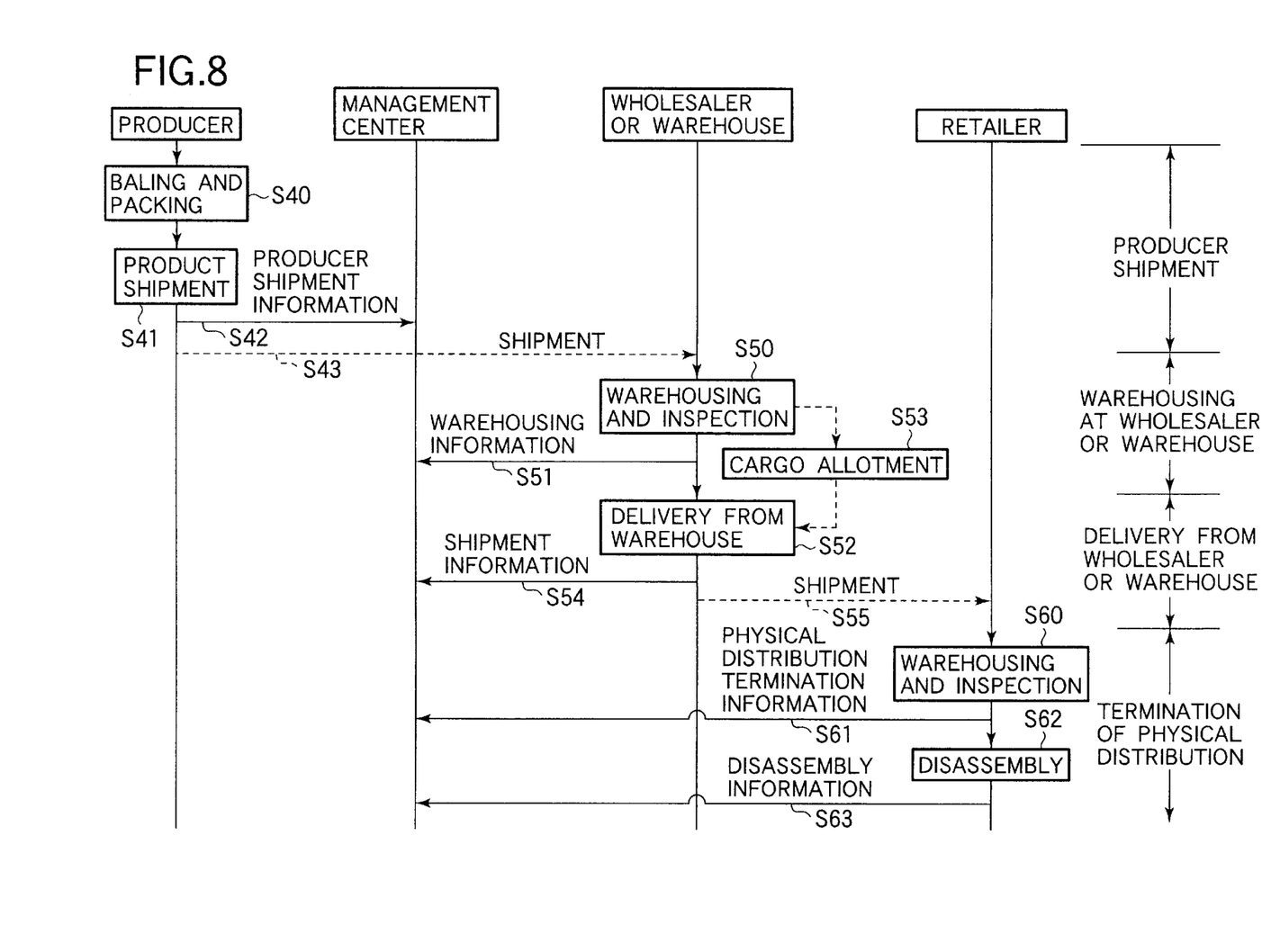
FIG. 8 is a flow chart showing a part of the example of an operation according to the invention.
Figure 9:
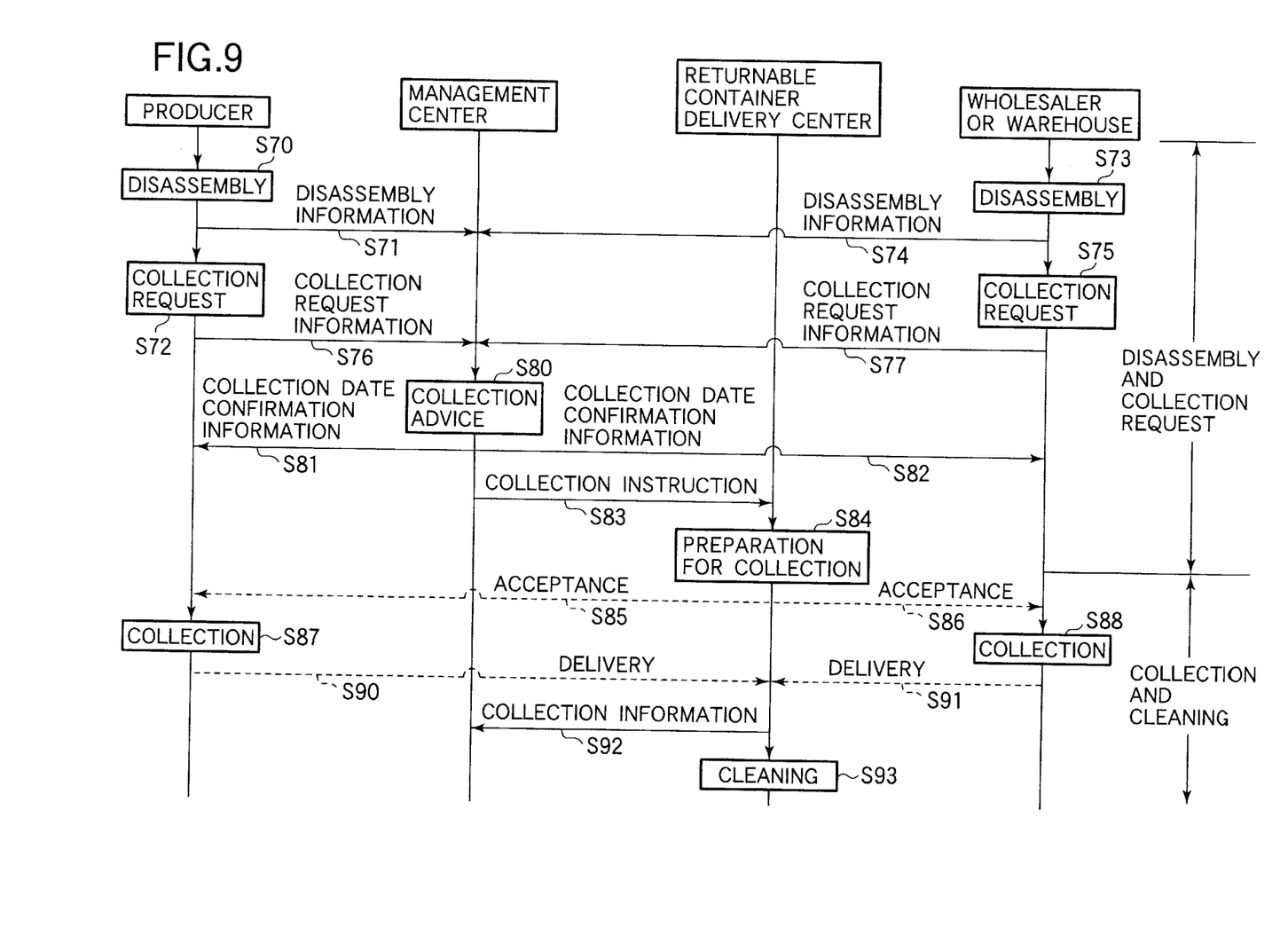
FIG. 9 is a flow chart showing a part of the example of an operation according to the invention.

A description will be made with reference to the flow chart in FIGS. 7 through 9 on an operation of a returnable container physical distribution management system using an information system according to the invention in a configuration as shown in FIG. 3. The term "IC card" in the following description represents a general IC card 11 or individual IC card 14 or both of a general IC card 11 and individual IC card 14 depending on situations.

First, when a producer inputs order information with the terminal 2 to place an order for returnable containers 10 to the management center 20 through the internet 1 (step S1), the management center 20 accepts the order for returnable containers by checking the client, quantity, the type of the returnable containers and scheduled date of distribution based on the order and by determining the order number, distribution center (returnable container delivery center), and so on (step S2). Then, the management center 20 prepares a distribution advice by the server 21 (step S3), transmits delivery confirmation information to the producer to advice the producer of the delivery confirmation (step S4) and transmits delivery advise information to the returnable container delivery center (step S5). This is a physical distribution route associated with order entry.

The order information comprises the quantity, the period of use and the type of returnable containers. The delivery confirmation information comprises the order information, delivery confirmation information (time of delivery, quantity, destination and order number), and the delivery advice information comprises the order information and delivery advice information (time of delivery, quantity, orderer and order number).

When an order entry operation as described above is completed, the returnable container delivery center accepts the delivery advice based on the delivery advice information thus received (step S10). The server 21 at the management center 20 gives a distribution instruction (step S11) and notifies the returnable container delivery center of the delivery instruction information (step S12), and the returnable container delivery center accepts the distribution instruction (step S13) and prepares returnable containers 10 by performing operations such as cleaning, initialization of user/product information and completing the required quantity (step S14). The operation of initializing user/product information in this context is to store required data in the IC cards attached to the returnable containers 10. This is a physical distribution route associated with a distribution instruction.

The distribution instruction information comprises the order information, delivery advice information and distribution instruction information (time of delivery, quantity, orderer, order number and scheduled date of distribution).

Thereafter, the returnable container delivery center ships the returnable containers 10 (steps S20 and S22) and notifies the management center 20 of shipment information (step S21). The producer carries out processes of receiving and inspecting the returnable containers 10 (step S23) and notifies the management center 20 of inspection information (step S24). The data in the IC cards attached to the returnable containers 10 are also updated. The producer then checks the inventory of the returnable containers 10 that have arrived (step S25). This is a physical distribution route associated with shipment, leasing and charging of returnable containers.

The shipment information comprises the delivery advice information, distribution instruction information and shipment information (date of shipment, quantity, orderer, order number and returnable container numbers). The inspection information comprises the order information, delivery advice information, distribution instruction information and inspection information (date of shipment, date of inspection, orderer, order number and returnable container numbers).

After checking the inventory, the producer carries out an operation of registering product information by assembling returnable containers 10 in the inventory (step S30), writing required data in the IC cards attached to the returnable containers 10 and visibly entering required information in the entry sections 12 using pictures, characters, and so on (step S31). Then, the product information is transmitted to the management center 20 (step S32). This is a physical distribution route associated with assembly and registration of product information.

The product information comprises the order information, delivery advice information, distribution instruction information, shipment information, inspection information and start-of-use information (date of assembly, product name, product code, quantity per case, producer name, producer code, type of cooling and shipment lot number).

Thereafter, the producer bales or packs the returnable containers 10 (step S40), ships the products baled in the returnable containers 10 to a wholesaler and/or warehouse (steps S41 and S43) and transmits producer shipment information to the management center 20 (step S42). This is a physical distribution route associated with a shipment from a producer.

The producer shipment information comprises the order information, delivery advice information, distribution instruction information, shipment information, inspection information, start-of-use information and producer shipment information (date of shipment, product name, product code, quantity per case, producer name, producer code, type of cooling and shipment lot number).

When the products are transported to the wholesaler and/or warehouse as described above, the wholesaler and/or warehouse warehouses the returnable containers 10 shipped by the producer, inspects the products in the warehoused returnable containers 10 (step S50) and transmits warehousing information to the management center 20 (step S51). Then, the products are delivered from the warehouse to be shipped to the retailer directly (step S52) or delivered from the warehouse after cargo allotment (step S53). Warehouse delivery information is transmitted to the management center 20 (step S54)., and the products are shipped to the retailer (step S55). The data in the IC cards 1 attached to the returnable containers 10 are updated at the time of shipment. As thus described, steps S50, S51 and S53 represent a physical distribution route associated with warehousing at a wholesaler and/or warehouse. Steps S51, S54 and S55 represent a physical distribution route associated with delivery from a wholesaler or warehouse. Further, steps S52, S54 and S55, respect a physical distribution route associate with shipping at a wholesaler and/or warehouse.

The warehousing information comprises the order information, delivery advice information, distribution instruction information, shipment information, inspection information, start-of-use information, producer shipment information and warehousing information (date of warehousing). Warehouse delivery information comprises the order information, delivery advice information, distribution instruction information, shipment information, inspection information, start-of-use information, producer shipment information, warehousing information and warehouse delivery information (date of delivery from the warehouse).

The retailer warehouses the returnable containers 10 shipped from the wholesaler and/or warehouse and inspects the products in the warehoused returnable containers 10 (step S60) and transmits physical distribution termination information to the management center 20 (step S61). After the inspection, the returnable containers 10 are disassembled so that they can be easily arranged in order (step S62), and disassembly information is transmitted to the management center 20 (step S63). This is a physical distribution route at the end of a physical distribution.

The physical distribution termination information comprises the order information, delivery advice information, distribution instruction information, shipment information, inspection information, start-of-use information, warehousing information, warehouse delivery information and physical distribution termination information (date of warehousing at the end of the physical distribution). The disassembly information comprises the order information, delivery advice information, distribution instruction information, inspection information, start-of-use information, producer shipment information, warehousing information, warehouse delivery information, physical distribution termination information and disassembly information (date of disassembly and disassembler).

The producer disassembles the returnable container 10 after warehousing them (step S70) and transmits disassembly information to the management center 20 (step S71). At this time, the data in the IC cards 1 attached to the returnable container 10 are also updated. The wholesaler and/or warehouse also disassembles the returnable containers 10 after warehousing them (step S73) and transmits disassembly information to the management center 20 (step S74). At this time, the data in the IC cards attached to the returnable containers 10 are also updated. The producer and the wholesaler and/or warehouse make a request for collection of the returnable containers 10 after disassembling them (steps S72 and S75) and transmit collection request information to the management center 20 (steps S76 and S77). Upon receipt of the collection request information transmitted by the producer and wholesaler and/or warehouse, the management center 20 generates a collection advice (step S80) and transmits collection date acknowledgement information to the producer and wholesaler and/or warehouse to get acknowledgement on the date of collection from the collection requesters (steps S81 and S82). The data in the IC cards 1 attached to the returnable containers 10 are also updated. Then, the management center 20 issues a collection instruction to the returnable container delivery center (step S83), and the returnable container delivery center makes a preparation for the collection of the returnable containers 10 according to the instruction (step S84). This is a physical distribution route associated with disassembly and collection request.

The collection request information comprises the order information, delivery advice information, distribution instruction information, shipment information, inspection information, start-of-use information, producer shipment information, warehousing information, warehouse delivery information, physical distribution termination information, disassembly information and collection request information (collection request number, date of collection request and collection requester). The collection date acknowledgement information comprises the order information, delivery advice information, distribution instruction information, shipment information, inspection information, start-of-use information, producer shipment information, warehousing information, warehouse delivery information, physical distribution termination information, disassembly information, collection request information and collection acceptance information (scheduled date of collection).

Thereafter, the returnable container delivery center visits the producer and wholesaler and/or warehouse to accept the returnable containers 10 from the producer and wholesaler and/or warehouse (steps S85 and S86) and collects the returnable containers 10 at the sites of the producer and wholesaler and/or warehouse (steps S87 and S88). Finally, the returnable containers 10 are directly delivered from the producer and wholesaler and/or warehouse to the returnable container delivery center (steps S90 and S91). When the returnable containers 10 are thus collected by the returnable container delivery center, the returnable container delivery center notifies the management center 20 of collection information (step S92). The collected returnable containers 10 are cleaned at the returnable container delivery center (step S93) to be on standby for the next order. This is a physical distribution route associated with collection and cleaning.

The collection information comprises the order information, delivery advice information, distribution instruction information, shipment information, start-of-use information, producer shipment information, warehousing information, warehouse delivery information, physical distribution termination information, disassembly information, collection request information, collection acceptance information and collection information (date of collection).

As described above, in the returnable container physical distribution management system using an information system according to the invention having a configuration as shown in FIG. 3 that has been described with reference to the flow chart in FIGS. 7 through 9, the returnable container delivery center ships returnable containers 10 and collects returnable containers 10 that have been used. The invention is not limited to such an operation and, for example, the shipment of returnable containers 10 may alternatively be directly carried out by the management center 20 itself, and a returnable container collecting agent may collect used returnable containers 10 in place of the returnable container delivery center.

While there is no mention to the party who actually transports returnable containers 10 loaded with products from the producer to the wholesaler and/or warehouse and to the party who actually transports returnable containers 10 loaded with products from the wholesaler and/or warehouse to the retailer in the above-described mode for carrying out the invention, they may be transported by the returnable container delivery center or a specialized transporter who is not shown.

While an operation of a returnable container physical distribution management system using an information system according to the invention has been described above (with attention focused on the flow of returnable containers 10), a description will now be made on the flow of information (with attention focused on the flow of IC cards).

Prior to the description of the flow of information, a description will be made on JAN codes and SKU codes. JAN codes are bar codes for products defined according to JIS specifications. SKU codes are independent product codes used in the distribution industry and are numbers that are unique to clients (or users). In short, since SKU codes are defined by each group of companies and have not been standardized, one product can have three or four SKU codes. There is a trend in the distribution industry toward standardization of SKU codes such that one product will have only one SKU code.

Some products can be classified using only JAN codes. Some products can not be classified when only JAN codes are used. In such a case, JAN codes are used in combination with SKU codes to classify the products. For example, there are JAN codes for socks, and SKU codes play a role of classifying them into products in different colors and sizes. There is a trend in the distribution industry toward the use of JAN codes and SKU codes in combination to allow product classification.

Referring to product codes stored in IC cards used according to the invention, SKU codes that are defined and standardized in the distribution industry (public SKU codes) are stored along with SKU codes unique to each company (private SKU codes), and JAN codes are further provided in addition to the two types of SKU codes. Since this allows accurate classification of products, it is possible to improve the efficiency of product inspection and to improve the efficiency of a distribution system as a whole.

One general IC card 11 is attached to a plurality of returnable containers 10 to be delivered to each destination of products on a distribution route. Distribution information common to the plurality of returnable containers 10 is stored in the general IC card 11, including the destination of the products, product codes (a JAN code and SKU codes), the product name, the quantity of the returnable containers 10, the unit price (delivery price) and producer information. The card is substituted for a delivery slip which is otherwise used by the driver of the truck that actually transports the returnable containers 10.

Figure 10:
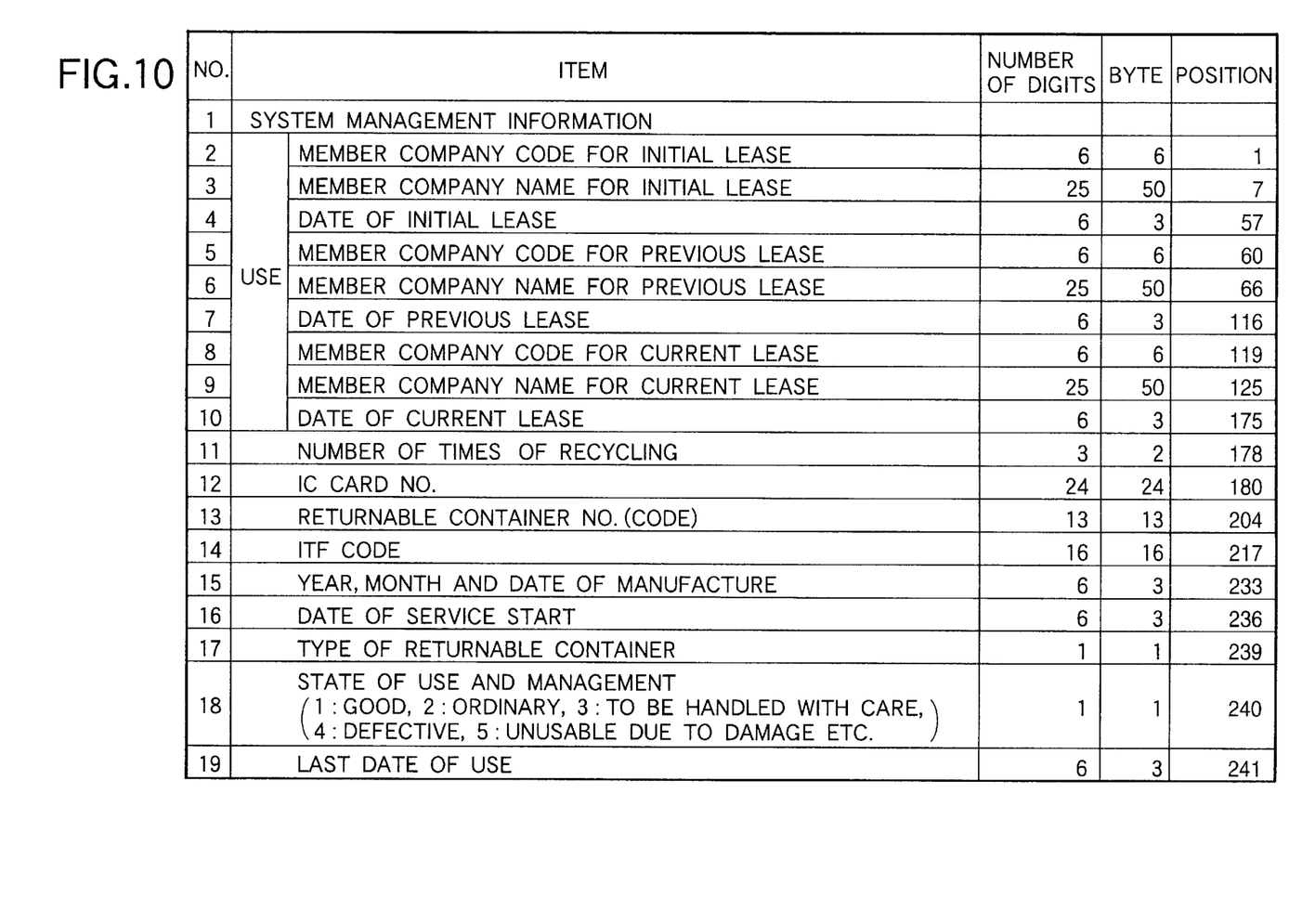
FIG. 10 shows a part of a specific example of information stored in an individual IC card.
Figure 11:
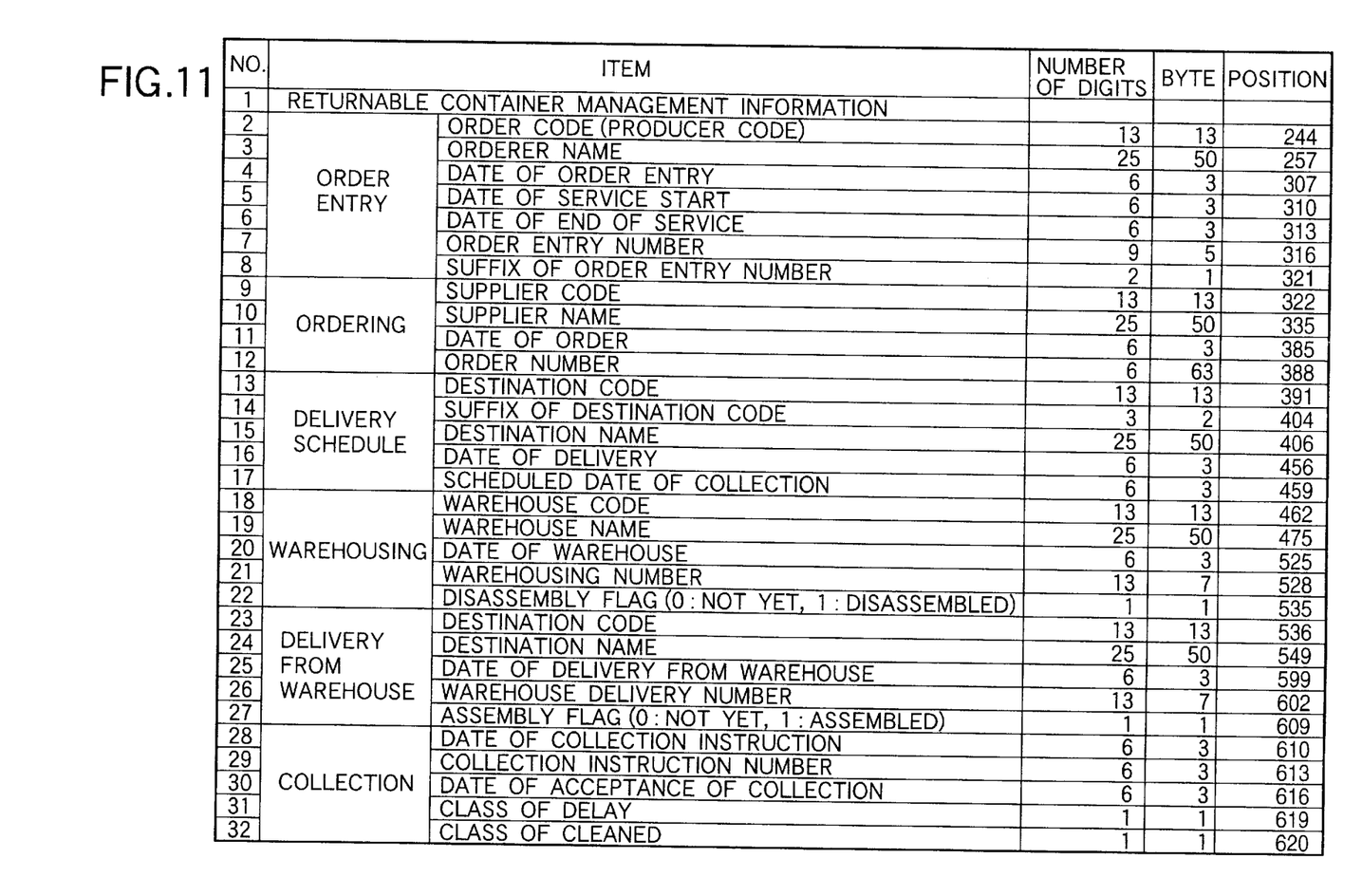
FIG. 11 shows a part of a specific example of information stored in an individual IC card.
Figure 12:
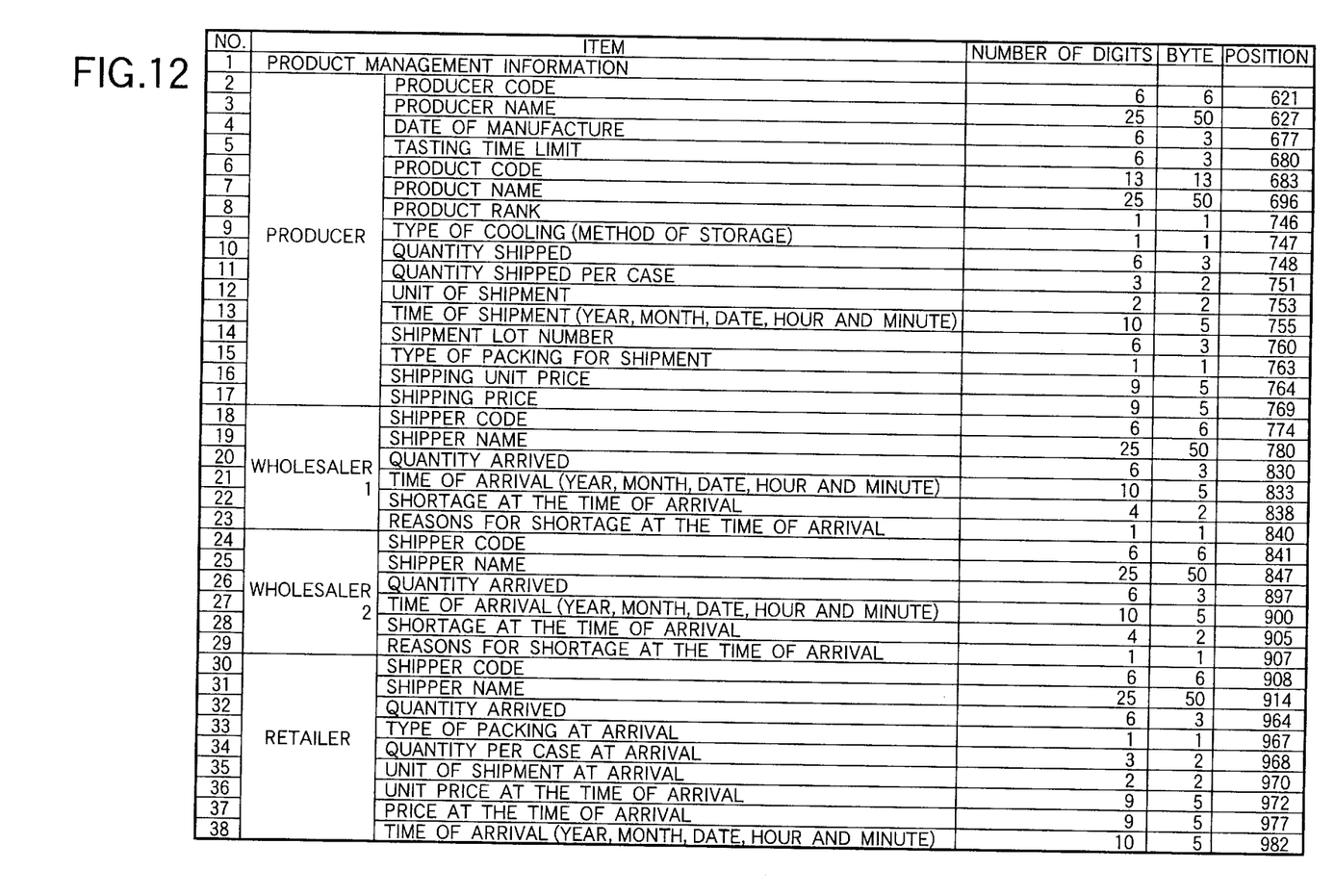
FIG. 12 shows a part of a specific example of information stored in an individual IC card.
Figure 13:
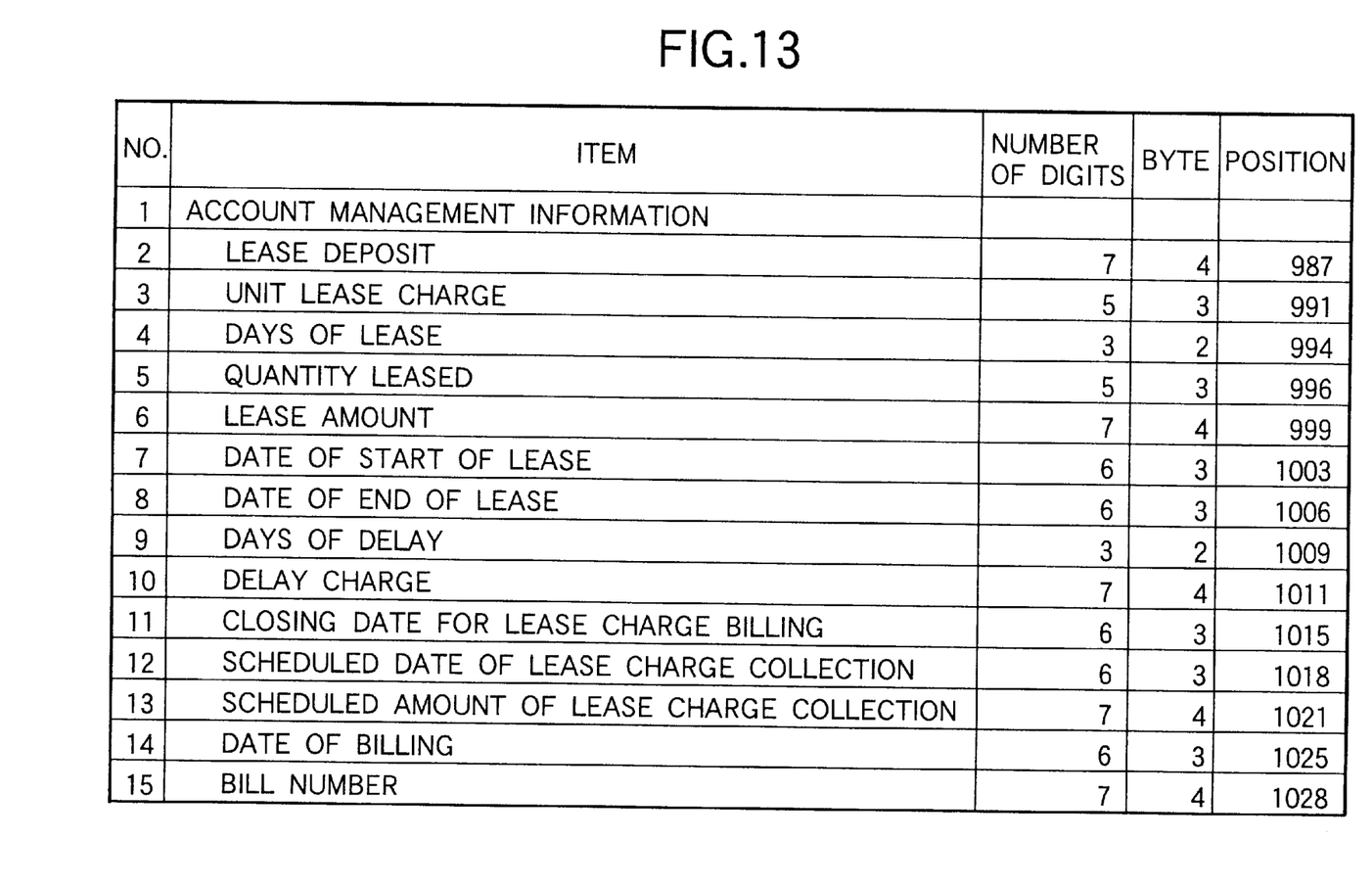
FIG. 13 shows a part of a specific example of information stored in an individual IC card.

Information stored in an individual IC card 14 includes all information regarding the products in the returnable container 10 and the returnable container 10 itself. By way of a specific example, information stored in an individual IC card 14 is constituted by system management information comprising a plurality of items as shown in FIG. 10, returnable container management information comprising a plurality of items as shown in FIG. 11, product management information comprising a plurality of items as shown in FIG. 12 and account management information comprising a plurality of items as shown in FIG. 13.

In the specific example shown in FIGS. 10 through 13, the term "member company" stands for the above-mentioned "producer", and returnable containers 10 are supplied to a "member company" on a rental basis under control of a management center.

Data stored in an IC card attached to a returnable container 10 are separated into a plurality of banks for each of which an access right for writing and reading can be set.

While no description was made on payment for products and returnable containers 10 in the above mode for carrying out the invention, payment for returnable containers 10 and products may be made through the internet. Alternatively, visible individual numbers (e.g., serial numbers) for returnable containers may be attached in the form of bar codes to allow customers to use the present system without membership of the system by utilizing the visible bard codes while protecting security by checking both of individual numbers recorded in IC cards and the individual numbers in the form of bar codes.

As thus described, with a returnable container physical distribution management system using an information system according to the invention, it is possible to provide a returnable container physical distribution management system that is adapted to the information society, and returnable containers that are transported between producers, wholesalers and/or warehouses and retailers can be efficiently managed because IC cards are attached to the returnable containers for easier connection to the internet.

INDUSTRIAL APPLICABILITY

With a returnable container physical distribution management system using an information system according to the invention, a returnable container physical distribution management system that is adapted to the information society can be provided in the field of physical distribution.

Further, a returnable container physical distribution management system using an information system according to the invention makes it possible to manage returnable containers that are transported between producers, wholesalers and/or warehouses and retailers efficiently and accurately because IC cards are attached to the returnable containers for easier connection to the internet.

What is claimed is:

1. A returnable container physical distribution management system using an information system characterized in that a computer network interconnects a terminal at a management center for governing the system as a whole, a terminal at a returnable container delivery center for distributing returnable containers having IC cards attached thereto, a terminal at a producer who produces and ships products, a terminal at a wholesaler and/or warehouse who wholesales and warehouses the products, and a terminal at a retailer, and in that data are transmitted and received between the computer network and the IC cards at the terminals in routes for physical distribution of the returnable containers to allow physical distribution of the returnable containers to be managed at the management center on a comprehensive basis;

wherein the IC card is any of only a first IC card, a combination of the first IC card and a second IC card, the returnable container has the first IC card of an embedded type and wherein transmission/reception of data to/from an external device is performed on non-contacting basis, and an IC card holding pocket in which the second IC card can be contained and an entry section for visibly entering required information using pictures, characters or the like are provided on a side of the returnable container.

2. A returnable container physical distribution management system using an information system according to claim 1, wherein the physical distribution route of the returnable containers is any of ordering, distribution instruction, shipment, leasing and charging of returnable containers, assembly and product information registration, shipment from the producer, warehousing at the wholesaler and/or warehouse and delivery from the wholesaler and/or warehouse or a combination of the same.

3. A returnable container physical distribution management system using an information system according to claim 2, wherein the physical distribution route of the returnable containers further includes, termination of the physical distribution of the returnable containers, disassembly and collection request and collection and cleaning.

4. A returnable container physical distribution management system using an information system according to claim 1, wherein payment for the returnable containers and products is carried out through the computer network.

5. A returnable container physical distribution management system using an information system according to claim 1, wherein data are stored for the current contract and the preceding contract in the IC card and are stored and erased at each contract.

6. A returnable container physical distribution management system using an information system according to claim 1, wherein data stored in the IC card are separated into a plurality of banks for each of which an access right for writing and reading can be set.

7. A returnable container physical distribution management system using an information system according to claim 1, wherein the first IC card embedded in the returnable container is configures so as to store distribution information required for distribution of the products housed in the returnable container.

8. A returnable container physical distribution management system using an information system according to claim 7, wherein the distribution information stored in the first IC card comprises system management information, returnable container management information, product management information, and account management information.

9. A returnable container physical distribution management system using an information system according to claim 1, wherein the second IC card storing common distribution information required for distribution of a plurality of the returnable containers to be delivered for each destination of the products on the physical distribution route is attached to the IC card pocket of one returnable container which is positioned at a leading of the plurality of the returnable containers.

10. A returnable container physical distribution management system using an information system according to claim 9, wherein the common distribution information stored in the second IC card comprises destination of the products, product codes(JAN codes and SKU codes), product name, quantity of the returnable containers, unit price(delivery price) and producer information.

* * * * *